Dec. 13, 1966  E. ALEXANDER ETAL  3,291,982
GRAZING INCIDENCE VACUUM SPECTROMETER HOUSING STRUCTURE
Filed March 31, 1966  2 Sheets-Sheet 1

INVENTORS
ERNST ALEXANDER
BENJAMIN S. FRAENKEL
BY
McGlew & Toren
ATTORNEYS

Dec. 13, 1966  E. ALEXANDER ET AL  3,291,982
GRAZING INCIDENCE VACUUM SPECTROMETER HOUSING STRUCTURE
Filed March 31, 1966  2 Sheets-Sheet 2

INVENTOR.
ERNST ALEXANDER
BENJAMIN S. FRAENKEL
BY

ATTORNEYS.

3,291,982
GRAZING INCIDENCE VACUUM SPEC-
TROMETER HOUSING STRUCTURE
Ernst Alexander and Benjamin S. Fraenkel, Jerusalem,
Israel, assignors to Yissum Research Development
Company, Jerusalem, Israel
Filed Mar. 31, 1966, Ser. No. 539,213
Claims priority, application Israel, Apr. 15, 1962,
17,132
7 Claims. (Cl. 250—51.5)

This application is a continuation-in-part of application Ser. No. 271,783, filed Apr. 9, 1963, now abandoned, for "Grazing Incidence Vacuum Spectrometer."

The present invention relates to vacuum spectrometers and, more particularly, to a novel vacuum spectrometer having a high accuracy and a high spectra resolution, and in which all of the movable optical parts of the spectrometer, disposed within a high vacuum, sealed container, are mounted fixedly on one common point of the container, whereby any change of the dimension of the container will have no effect on the geometry of the optical system of the spectrometer.

While the first-order spectra are obtainable with a considerable resolution, enabling, over a wide range, the determination of wave lengths up to an accuracy better than 0.01 Angstrom, there are cases where a much higher resolution is needed. This requires, for example, an accurately constructed spectrometer having a wide range, with rigidity of the mounting of movable parts as well as flexibility in adjustment and operation. Furthermore, it is desirable that these conditions be met in a spectrometer which is not too great in size and preferably has a size not greater than spectrometers having less accuracy and a smaller range of resolution.

An object of the present invention is to provide a vacuum spectrometer of high accuracy.

Another object of the invention is to provide a vacuum spectrometer which can be used over a wide range of frequencies.

A further object of the invention is to provide a spectrometer adapted to provide accurate measurements over a substantial range of short wave lengths.

Yet another object is to provide means for effecting measurements of multiply ionized atoms and for comparing intensities of different spectra as a function of various parameters.

Yet a further object of the invention is to provide a vacuum spectrometer of relatively simple construction, which will not be affected, as to accuracy of measurements, by changes of the sealed container due to changes in pressure.

With these considerations in mind, the present invention relates to a grazing incidence vacuum spectrometer comprising the combination of a vacuum-tight housing, adapted to withstand a high internal vacuum, and an axle assembly extending into the housing, in vacuum sealed relation, through an opening thereof and supporting, within the housing, two swingable arms extending at right angles from the axis of the axle assembly and positioned axially closely adjacent each other. The free end of one of these arms supports a suitable diffraction grating, of a given radius of curvature, and a slit system. The free end of the other arm supports a plate holder by means of which the plate is located on a Rowland circle having a radius of curvature half that of the diffraction grating. Other elements of the slit system extend, by means of a flexible bellows, in vacuum-tight relation through a second opening provided in the housing, and means are provided for establishing and maintaining a suitable vacuum within the housing.

Means are provided for turning the arm supporting the plate holder, from a position outside of the container, and other means are provided for moving the plate parallel to the supporting axis of its arm so as to enable the making of a number of consecutive exposures on the same plate without breaking the vacuum.

The diffraction grating preferably is angularly adjustable within a predetermined range so as to enable the obtaining of a range of angles of incidence of the radiation to be measured, which is introduced through the slit system into the housing.

The supporting axle means and the arms attached thereto are rigid and of substantial dimensions, whereby a high degree of accuracy is easily obtained.

As the source of radiation to be measured, there may be used a source of soft X-rays or a spark chamber. The desired radiation is introduced, as mentioned, into the housing through a window or opening so as to impinge on the grating at a predetermined angle of incidence. The radiation is focused, after diffraction, on the Rowland circle, where the diffraction radiation can be determined after exposure of the photographic plate located in the plane defined by the Rowland circle.

With the apparatus of the invention, measurements can be made effectively at a vacuum of about $10^{-5}$ mm. Hg in the housing of the spectrometer. When a spark chamber is used as a source of radiation, it is advantageous to use a vacuum of about $10^{-7}$ mm. Hg in the spark chamber, and the vacuum of the spectrometer can be used as the fore-vacuum of the spark chamber or X-ray tube.

For an understanding of the principles of the invention, reference is made to the following description of a typical embodiment thereof as illustrated in the accompanying drawings.

Figure 1:
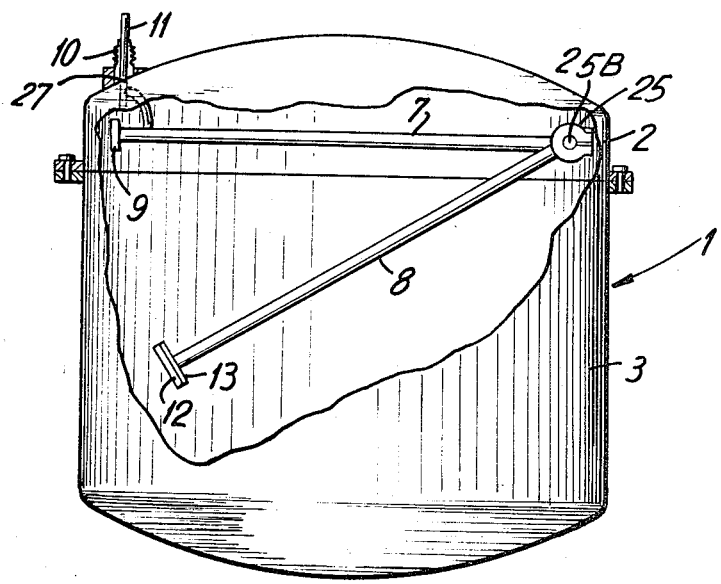
FIG. 1 is a somewhat schematic plan view of the spectrometer.
Figure 2:
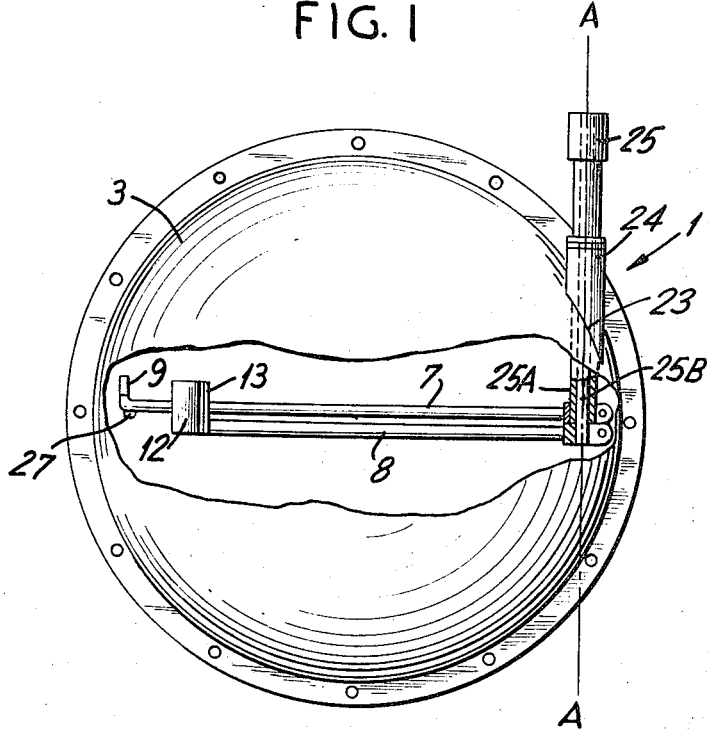
FIG. 2 is a front elevation view of the spectrometer, partly broken away and in section.
Figure 3:
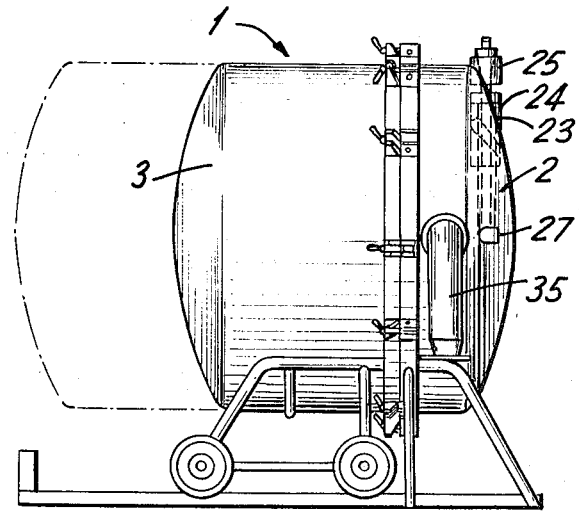
FIG. 3 is a side elevation view of the spectrometer.

The vacuum container 1 of the spectrometer is made of two parts, namely a fixed part 2 and a removable lid or cover 3. The fixed part has an opening 23 from which there extends a relatively heavy suport sleeve 24, the major portion of support sleeve 24 extending inwardly from opening 23 and a shorter portion thereof extending outwardly therefrom. An axle assembly or cone 25 is angularly adjustably mounted within bushing or sleeve 24 and comprises telescoped male and female parts extending from externally of container 20 to a point internally thereof. The female element 25A of cone 25 supports, at its lower or inner end, a horizontal arm 7, to the free end of which are attached the grating holder 9, and the slit system generally indicated at 11. The plate holder 12, or, alternatively, a multiplier, are attached to the male part 25B of cone 25 by means of a second horizontal arm 8 which has a range of movement through an angle of 90°. The male and female parts of cone 25 are telescoped, and the center of the Rowland circle lies on the vertical axis A—A defined by the cone 25.

The sleeve 24, in conjunction with the opening 23 through which it extends, constitutes a firm vacuum-tight support for the movable elements of the optical system, particularly the arms 7 and 8. As stated, the arm 7 supports, at its free end, a grating 9 which is a Siegbahn grating of substantially 30,000 lines per inch, and having a radius of curvature of 2 meters.

Figure 4:
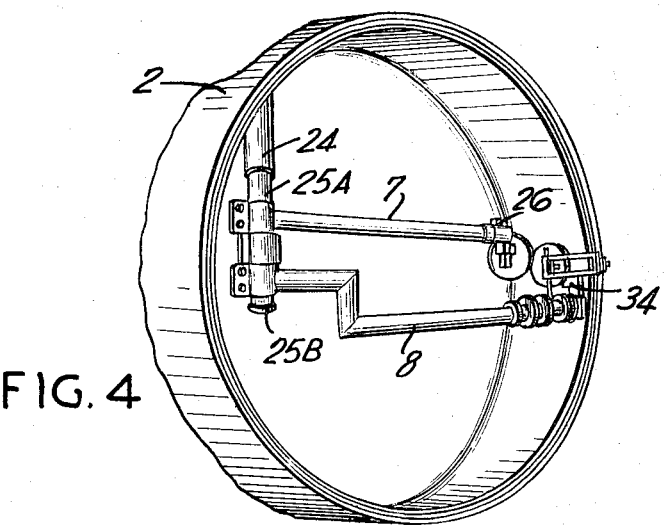
FIG. 4 is a partial perspective view of the interior of the spectrometer.
Figure 5:
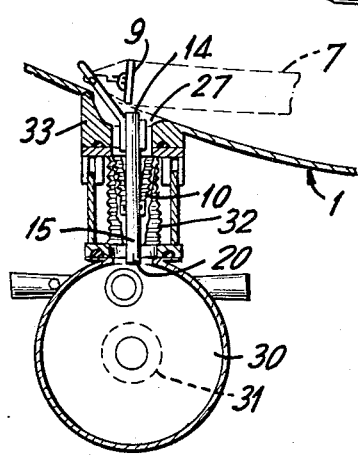
FIG. 5 is a sectional view illustrating the slit system and an associated spark chamber.

As best seen in FIGS. 4 and 5, the hollow horizontal arm 7 extending from the female part of the cone 25, supports, near its free end, an adjustable sleeve 26. This sleeve supports the slit system, generally indicated at 11, and the grating holder 9. The grating holder is built in such a manner that the grating is angularly adjustable about three perpendicular axes intersecting at the central point of the surface of the grating, and is also movable along three mutually perpendicular directions. The slit system is physically connected with the container by a flexible bellows 10 so as to permit movement while maintaining the vacuum within the container. Means are provided for moving the slit system 11 grating so that it will make a predetermined grating angle of between about 1° and about 10° with the diffraction grating.

The slit system 11, as best seen in FIG. 5, comprises a main slit 20 which is at a distance from the center of the grating, for a grazing incidence angle of 5° and a Rowland circle of 1 mm. radius, of about 17.5 cm. A secondary slit 14 which, under the given conditions, is 3 cm. from the center of the grating, is incorporated with the main slit 20 into the slit system 4 and the slits are joined together by a 12 mm. diameter stainless steel tube 15 about 14.5 cm. in length. The secondary slit 14 is interchangeable with similar slits, of various widths, and the width of the secondary slit determines the width of the area of the grating participating in reflection. This width may therefore be changed according to the "optimal width" correlated to the wave length range being investigated. The slit system extends through an opening 27 through the housing, which is sealed vacuum-tight by the bellows 10, and the opening 27 leaves room for changing the grazing incidence angle from about 1° to about 10°. This change can be performed by rotating the slit system about an axis through the central point of the grating, parallel to the main axis of the instrument. Adjustment about another axis provides for the slit system to be adjusted to point to the center of the grating.

Referring to FIG. 5, a soft X-ray tube or spark chamber 30 provides the source of radiation, and a tube or conduit 31 leads therefrom to an evacuating system. An adjustable bellows system 32 connects the X-ray tube or spark chamber to a collar 33 aligned with the opening 27.

Referring again to FIG. 5, it should be noted that a vacuum is maintained both inside and outside the bellows 10, as the interior of this bellows is subjected to the vacuum within the container of the spectrometer and the exterior thereof is subjected to the vacuum in the spark chamber or soft X-ray tube. Thereby, the vacuum difference between the spark chamber or soft X-ray tube and the interior of the casing of the spectrometer is governed by the slit opening only and not by the opening of the hole through which the slit system extends into the body.

The plate holder 12 is essentially a stainless steel frame ground to a radius of curvature of 1 meter and built, for example, to hold 10 x 2 inch thin glass plate 13. The plate holder 12, as stated is mounted on the angularly displaceable arm 8 extending from the male part 25B of cone 25. The plate holder may be elevated, in a direction parallel to axis A—A, so that seven different exposures may be taken on the film each about 5 mm. wide. Also, as best seen from FIG. 1, the plate holder may be moved on the Rowland circle from a position adjoining the grating to a position at an angle of about 90° with the grating. Both movements may be effected from outside the casing of the spectrometer by rotating the part 25B at the protruding upper end thereof. The elevating motion is effected by a lever provided with a ratchet which acts on a dove-tail member 34 (FIG. 4) supporting plate holder 12. The elevating motion is effected by swinging the plate holder arm 8 against a fixed stop at its end position causing the pivoted lever to be actuated to operate the ratchet. Thereby, different exposures at different wave length ranges may be made without breaking the vacuum within the instrument.

The plate 12 can be adjusted radially with respect to axis A—A in a very accurate manner, up to 0.01 millimeter. With the two arms 7 and 8 aligned, an indicator can be placed on arm 7 and the exact distance from axis A—A can be noted by putting the tip of the indicator on film 13 in plate holder 12. The arm 8 is then swung about its axis and the indicator used to measure the distance of grating 9 from the axis A—A is the same as the reading of the previously adjusted plate 13 and plate holder 12.

As both arms 7 and 8 are, in effect, adjustable about the same axis A—A, and due to the provision of the flexible bellows 10, possible changes of the dimension of the container 1 due to differences of pressure will not adversely affect the accuracy of the measurements.

A third opening is provided in the casing or container of the spectrometer and has attached thereto, in vacuum-tight relation, a duct 35 which is connected to a vacuum pump, such as a 300 liter per second 4 inch diffusion pump. The spectrometer serves as a fore-vacuum container for the X-ray tube, which is additionally evacuated by a 60 liter per second 2 inch diffusion pump connected to the duct 31. Furthermore, a 450 liter per minute single-stage rotary vacuum pump is used as a fore pump.

With the vacuum spectrometer of the invention, its possible to investigate short wave lengths with great accuracy by using high orders of diffraction. For example, the line 192,906 A. of 0 v. was observed in the 11th order. We found that with the accuracy of adjustment up to 0.01 mm. of the optical geometry on the Rowland circle, and with the angle of turning of 90° of the arm supporting the plateholder, a spectral range of from 90 A. to 2,300 A. could be investigated with a high resolution.

The spectrometer is operated at a vacuum of about $10^{-5}$ mm. Hg in the housing 1 and the radiation is introduced through the slit system 10. When a soft X-ray tube or a spark chamber is used as source of radiation, such source is advantageously operated at a pressure of about $10^{-7}$ mm. Hg. In this case it is advantageous to use the vacuum of the housing 1 as fore-vacuum of the source of radiation.

Although a specific embodiment of the invention has been shown and described in detail to illustrates the application of the principles of the invention, it will be understood that the invention may be embodied otherwise without departing from such principles.

What is claimed is:

1. A grazing incidence vacuum spectrometer comprising, in combination, a vacuum-tight housing adapted to withstand a high internal vacuum; a sleeve extending in vacuum-tight relation through an opening in said housing; a pair of axles extending rotatably through said sleeve in vacuum-tight relation therein, said axles being concentric with said sleeve and one of said axles being a tubular axle and the other axle extending through said tubular axle in telescoped relation therewith; a pair of arms within said housing, each secured to the inner end of a respective one of said axles and extending radially from the associated axle, said arms being positioned closely adjacent each other axially of said axles; said axles providing for independent angular adjustment of said two arms about the common axis of said axles; a diffraction grating, having a preselected radius of curvature, and a slit system supported at the free end of one of said arm; a photographic plate holder supported on the free end of the other arm, a photographic plate thereon being positioned on the Rowland circle having half the radius of curvature of the diffraction grating; said diffraction grating and said plate holder being disposed at substantially the same radius from the common axis of said axles whereby a photographic plate on said plate holder may be brought into substantial coincidence with said diffraction grating; a source of radiation under a relatively high vacuum in operative connection with the external end of said slit system for directing radiation through said slit system to impinge on said grating; said slit system extending through another opening in said casing; a bellows in vacuum-tight connection to said casing and to said slit system and subjected on its interior to the vacuum in said housing and on its exterior to the vacuum of said source of radiation; and means for establishing and maintaining a substantial vacuum in said housing; whereby, the optical system of said spectrometer is supported from a single point which is said sleeve and said two axles, so that the interrelation of the optical parts is not effected by changes in dimension of the housing.

2. A vacuum spectrometer, as claimed in claim 1, in which said slit system includes a relatively elongated tube extending through said bellows and having slits, one at the outer end thereof and the other at the inner end thereof, said tube being supported on said one arm and said one arm being adjustable through a relatively limited angle.

3. A vacuum spectrometer, as claimed in claim 1, said diffraction grating being adjustable on the free end of said one arm about three mutually perpendicular axes to adjust the angle of incidence of the radiation on said grating within a preselected limit.

4. A vacuum spectrometer, as claimed in claim 1, wherein the angle of incidence of the radiation impinging upon said grating is adjustable between an angle of from 1° to 10°.

5. A vacuum spectrometer, as clamed in claim 1, wherein said other arm supporting said plate holder is adjustable through an angle in excess of 30°.

6. A vacuum spectrometer, as claimed in claim 1, including means for adjusting said plate holder transversely of said other arm and in a direction parallel to said common axis, whereby a plurality of consecutive exposures can be made on one photographic plate on said plate holder.

7. A vacuum spectrometer, as claimed in claim 1, wherein the vacuum of said housing serves as a forevacuum for external source of radiation, under a high vacuum, and which source is selected from sources consisting of soft X-ray tubes and spark chambers.

No references cited.

RALPH G. NILSON, *Primary Examiner.*

ANTHONY L. BIRCH, *Assistant Examiner.*